UNITED STATES PATENT OFFICE.

JAMES ALEXANDER LAWSON, OF CHICAGO, ILLINOIS.

FOOD COMPOUND.

1,403,122.     Specification of Letters Patent.     Patented Jan. 10, 1922.

No Drawing.     Application filed March 3, 1920. Serial No. 363,080.

*To all whom it may concern:*

Be it known that I, JAMES A. LAWSON, a citizen of the United States, residing at No. 624 West 46th Place, Chicago, in the county of Cook and State of Illinois, have invented a new and useful Food Compound, of which the following is a specification.

My invention relates to a food compound and has reference more particularly to a substitute for butter as well as shortening and the like compounds.

As heretofore practiced, various butter and the like substitutes have been offered to the trade, but the same are open to objection for various reasons.

In accordance with my invention, I propose to produce a product which will contain a high vitamin and lipoid food value, and at the same time, be comparatively cheap to produce, exceedingly convenient to use and much more palatable than the so-called scubstitutes now in use.

For convenience, I will first describe the product and the constituents which go to make up the same; also the manner of compounding these constituents.

First of all, I wish it to be understood that my product is in no way to be confused with those substitutes which require a dairy product as an essential element to insure vitamins and lipoids. This is the feature that I consider most important, and a decided departure from the heretofore accepted theory that cream, milk, skim milk, or butter and the like dairy products should necessarily comprise one of the important elements of a butter substitute as in my food product the vitamins are increased or decreased as may be desired, as will be presently described. Furthermore, I wish it again to be understood that while I will mention as an example, various substances, with which the invention may be reduced to practice with good results, I do not restrict myself solely to these elements, as I may find from further experiments various equivalents which will produce the same valuable results. Broadly speaking, I consider the essential characteristics of my product to include an oily or fatty substance combined with a colloid emulsifying agent of high vitamin value, and in combination with other constituents of less importance such as salt, sugar, with or without the use of coloring matter, or a preservative or artificial butter flavoring.

There are various products that may be relied upon and from which I can derive the oily or fatty substance referred to and there are also various products that I may rely on to obtain the so-called colloid emulsifying agent of high vitamin value, as for example, I have found in practice that the following products or their equivalents which when properly treated will be sufficient to supply the oily or fatty substance, namely: tomato seed oil; almond nut oil; apricot kernel oil; bean oil; cocoanut oil; cohune nut oil; coqueta nut oil; corn oil; cotton seed oil; date kernel oil; date oil; fig oil; olive kernel oil; olive oil; palm kernel oil; peach kernel oil; peanut oil; prune kernel oil; prune oil; raisin seed oil; rice hull oil; rice oil; sesame oil; soya bean oil; and animal fat and oils from cattle, sheep and hogs.

Furthermore, I have found, for example, that the following other products may be relied upon to furnish the colloid emulsifying agent, namely: almond meal; barley; barley flour; beans; beets; carrots; chestnuts; corn; corn meal; date meal; fig meal; oats; oat meal; peanut meal; peas; potato flour; prune meal; rice; rice bran; rice hulls; tapioca; walnut meal; wheat; wheat bran; wheat flour; whole wheat flour; dairy products.

From the above, it will be noted that I have specified examples of two different groups of products which may enter into the compound from which my butter substitute is made. In practice, I would prefer—and experiments have proven that I may do so with good results, use any one or any combination of the first mentioned group or their equivalents in combination with any one or any combination of the second named group, or their equivalents, to effect the required results.

As a further disclosure in reducing the invention to practice, I have found that the following examples of formulas will produce satisfactory results:

| | |
|---|---|
| Cocoanut oils | 70 % |
| Vegetable oils | 12 % |
| Extract of cereal and moisture | 5½% |
| Dairy products | 10 % |
| Salt | 2½% |
| Total | 100 % |

| | |
|---|---|
| Cocoanut oils | 70 % |
| Fruit kernel oils | 10 % |
| Vegetable oils | 2 % |
| Extract of cereal and moisture | 16 % |
| Salt | 2 % |
| Total | 100 % |

| | |
|---|---|
| Cocoanut oils | 68 % |
| Fruit seed oils | 6 % |
| Fruit kernel oils | 4 % |
| Vegetable oils | 4 % |
| Extract of cereal and moisture | 16 % |
| Salt | 2 % |
| Total | 100 % |

| | |
|---|---|
| Vegetable oils | 40 % |
| Fruit nut oils | 30 % |
| Animal fats and oils | 12 % |
| Extract of cereal and moisture | 16 % |
| Salt | 2 % |
| Total | 100 % |

| | |
|---|---|
| Fruit kernel oils | 82 % |
| Extract of fruit nuts, cereals and moisture | 16 % |
| Salt | 2 % |
| Total | 100 % |

| | |
|---|---|
| Fruit kernel oils | 82 % |
| Extract of cereals and moisture | 16 % |
| Salt | 2 % |
| Total | 100 % |

| | |
|---|---|
| Vegetable oils | 82 % |
| Extract of vegetable cereal and moisture | 16 % |
| Salt | 2 % |
| Total | 100 % |

| | |
|---|---|
| Fruit nut oils | 82 % |
| Extract of fruit nuts, cereals and moisture | 16 % |
| Salt | 2 % |
| Total | 100 % |

| | |
|---|---|
| Animal fats | 28 % |
| Vegetable oils | 54 % |
| Extract of cereal and moisture | 16 % |
| Salt | 2 % |
| Total | 100 % |

It should be appreciated that the products referred to on page 3 which may be relied on to furnish the colloid emulsifying agent, would be of no value to this end unless the same were first so prepared as to insure to the food compound the desired vitamin content. It is this feature of my invention which enables me to produce a most satisfactory compound without using the customary and heretofore required dairy products to insure the vitamins. As a matter of fact, not only can I produce a food product of a high vitamin content without the use of dairy products, but I have found in practice that by treating the products relied upon to furnish the colloid emulsifying agent in a certain way, I can increase the vitamin content over and above that which is obtained by the use of dairy products.

As an example of treating the products relied upon to furnish the colloidal emulsifying agent to produce this high vitamin content, I would state as follows:

The method adopted to find the lipoid contents of the fats and oils was based on observation that lecithin is soluble in concentrated acids, but is precipitated again when the acid solution is mixed with water, the acid used being hydrochloric of 1.19 specific gravity. The lipoid precipitate is easily separated from the diluted acid, after which it is collected on a filter, washed with acid water and dried at 100° C., and then weighed. After burning, the lipoids thus obtained give an ash which, when tested with a molybdic reagent, showed a large phosphorus content. The lipoids in the extracts and colloid matter are set free by treating the seed and vegetable matter with liquors that dissolve the albumens. (The "steep liquor" of corn starch is an example of such a solution.) The extract is subjected to heat within 80° F. to 212° F., after which it is cooled from within 212° F to 45° F., and the cooled extract is added to the oils or fats and the lipoid content increased or decreased by altering the proportion of extracts and fat.

I claim:

1. A food compound consisting of a base of an oily and/or fatty substance combined with a colloid emulsifying constituent produced from either nuts, vegetables, fruits or cereals or any combination of the same which have been previously treated to extract a vitamin and/or lipoid content in proportion to increase the food value of the product.

2. A food compound consisting of a base of oil produced from nuts, nut kernels, vegetables, fruits, and animal fat and animal oils combined singly or in any combination with a colloid emulsifying constituent produced from either nuts, vegetables, fruits or cereals or any combination of the same which have been previously treated to extract a vitamin and/or lipoid content in proportion to increase the food value of the product.

3. A food compound consisting of a base of an oily and/or fatty substance, and a dairy product combined with a colloid emulsifying constituent produced from either nuts, vegetables, fruits or cereals, or any combination of the same, which have been previously treated to extract a vitamin and/or lipoid content in proportion to increase the food value of the product.

JAMES ALEXANDER LAWSON.